United States Patent [19]

Huebner

[11] 3,960,452
[45] June 1, 1976

[54] COLOR MONITOR UTILIZING AMBIENT LIGHT ILLUMINATION

[75] Inventor: Victor R. Huebner, Fullerton, Calif.

[73] Assignee: Technical Hardware, Inc., Fullerton, Calif.

[22] Filed: Mar. 5, 1975

[21] Appl. No.: 555,357

[52] U.S. Cl. .............................. 356/173; 250/226; 356/178; 356/186; 356/195
[51] Int. Cl.² .......................................... G01J 3/50
[58] Field of Search ............. 356/45, 173, 176–178, 356/186, 195; 250/226

[56] References Cited
UNITED STATES PATENTS 2,802,390   8/1957   Nimeroff et al. .................. 356/176

FOREIGN PATENTS OR APPLICATIONS 623,584   7/1961   Canada ............................. 356/177
113,865   3/1918   United Kingdom ................. 356/45
612,678   4/1949   United Kingdom ................. 356/45

Primary Examiner—John K. Corbin
Assistant Examiner—F. L. Evans
Attorney, Agent, or Firm—Philip M. Hinderstein

[57] ABSTRACT

A color analyzer simultaneously responsive to light intensity at multiple wavelength regions emitted by or reflected from a specimen illuminated by existing ambient light for instantaneously determining relative ratios of the wavelength regions comprising a plurality of interchangeable photodetectors having different spectral response characteristics; a separate optical probe for each photodetector for imaging the light emitted by or reflected from the specimen onto its associated photodetector, the optical probes having identical dimensions and imaging characteristics and being arranged in side-by-side, parallel relationship in order to permit each optical probe to be affected equally by ambient light changes; and means responsive to the outputs of the photodetectors for ratioing such outputs and providing the resultant ratio signals for utilization. Also disclosed is a closed loop feedback system to permit the individual ratios of any or all of the photodetectors to be monitored simultaneously.

7 Claims, 5 Drawing Figures

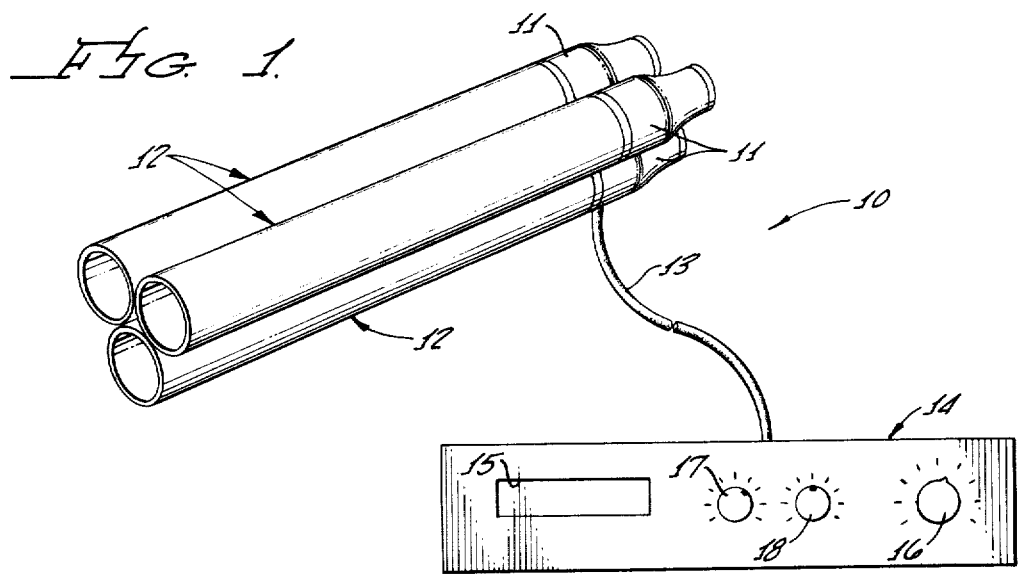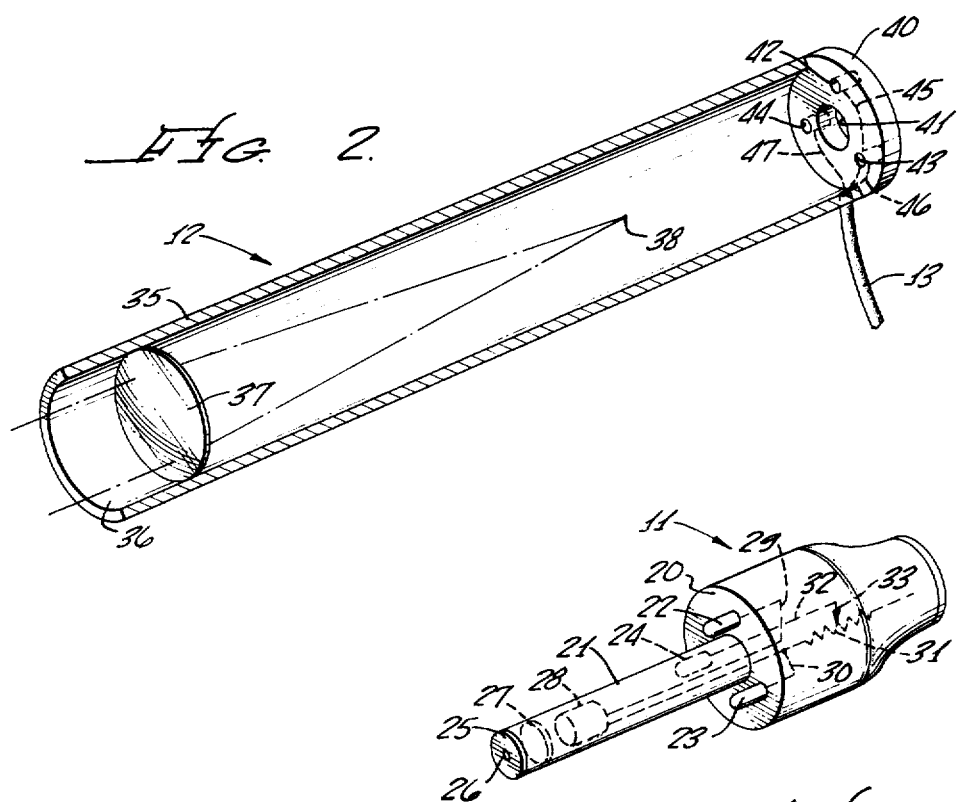

COLOR MONITOR UTILIZING AMBIENT LIGHT ILLUMINATION

BACKGROUND OF THE INVENTION

1. Field of the Invention

The present invention relates to a color monitor utilizing ambient light illumination and, more particularly, to a color analyzer simultaneously responsive to light intensity at multiple wavelength regions emitted by or reflected from a specimen illuminated by existing ambient light for instantaneously determining relative ratios of the wavelength regions.

2. Description of the Prior Art

In the field of color measurement, it has been the general practice to mount a specimen within a chamber having a carefully controlled light source. The relative spectral reflectance at various wavelengths is then determined by either a scanning spectrophotometer or a multiple array of photodetector-spectral filter modules.

In the case of a scanning spectrophotometer, light energy from wavelength regions of greatest interest is integrated and then subjected to various computational procedures so as to obtain numerical values related to the relative reflectance characteristics at the wavelength regions of interest. Since this method usually requires several minutes to scan the spectrum, sample or light instabilities create major errors. In addition, the complexity of the computations makes this type of system very expensive.

The multiple detector-filter instruments usually employ three detectors having spectral response characteristics closely matching those of the CIE Standard Observer. The Standard Observer consists of values recommended by the Commission Internationale de l'Eclairage (CIE) giving the response of each of three assumed photochemical processes in the eye to light of each of the wavelengths of the visible spectrum. These response functions are designated $\bar{x}$, $\bar{y}$, and $\bar{z}$, $\bar{x}$ = red, $\bar{y}$ = green, $\bar{z}$ = blue, and are known as the tristimulus values.

The CIE Standard Observer spectral response characteristics cover three very broad regions between 400 and 750 nanometers. These broad wavelength characteristics make it very difficult to detect small color differences between two samples. Furthermore, the accuracy is sharply degraded by metamerism, a phenomenon whereby two samples with markedly different spectral compositions can have the same appearance, as well as tristimulus values, with one particular lighting situation but appear considerably different under another type of illumination.

In either the spectrophotometer or multiple detector-filter instruments, the specimen generally must have uniform color, be of a relatively large size, and be capable of being held flat. This greatly limits the usefulness of these instruments, especially for process control applications.

SUMMARY OF THE INVENTION

According to the present invention, there is provided an instrument for instantaneous color measurements that overcomes the primary disadvantages of the color monitors currently in general use. The present color monitor makes instantaneous and simultaneous color measurements of light intensity at multiple wavelength regions, thereby eliminating the errors caused by sample and light instabilities. With the present monitor, closed chambers and carefully controlled light sources are completely eliminated. The specimen need not be of any particular size and need not be capable of being held flat. Thus, the present monitor is useful in a wide variety of applications.

The present color monitor includes a unique system of interchangeable detector-filter modules and optical probes that can be used for measuring the tristimulus values of surfaces illuminated by existing ambient light. If desired, the detector-filter modules can have the broad band CIE Standard Observer spectral response characteristics to conform to the outputs of other color monitors. On the other hand, these broad band detector-filter modules can be quickly replaced by narrow bandpass detector-filter modules in order to increase sensitivity to small changes, to reduce errors due to metamerism, and to better fit the spectral characteristics of the particular specimen being measured. With judicious selection of these narrow bandpass detectors, accuracies approaching those of scanning spectrophotometer systems can be realized.

The present color monitor includes a plurality of photodetectors having different spectral response characteristics and a separate optical probe for each photodetector for imaging the light emitted by or reflected from a specimen onto its associated photodetector, the optical probes having identical dimensions and imaging characteristics and being arranged in a side-by-side, parallel array in order to permit each optical probe to be affected equally by ambient light changes. This permits accurate results to be obtained regardless of the type or location of the illumination source and permits the use of ambient illumination. This, in turn, makes it possible to analyze the color of specimens on a continuous basis rather than on a batch laboratory-type basis.

The output of each photodetector is applied to an electronic circuit which provides power to the detectors, amplifies the detected output signals, computes the desired algebraic equations of interest, and presents suitable output signals for operating a meter display, analog recorder, or digital computer. The complete system of detectors, probes, and read-out instrument makes it possible to accurately monitor the colors of specific specimens in specific wavelength regions, to numerically display an output, and to control subsequent processes.

OBJECTS

It is therefore an object of the present invention to provide a color monitor utilizing ambient light illumination.

It is a further object of the present invention to provide a color analyzer simultaneously responsive to light intensity at multiple wavelength regions emitted by or reflected from a specimen illuminated by existent ambient light for instantaneously determining relative ratios of the wavelength regions.

It is a still further object of the present invention to provide a color monitor for providing instantaneous measurement of the color chromaticity of a time variant illumination source or the surface of a specimen illuminated by an external light source.

It is another object of the present invention to provide a highly stable instrument for measuring chromaticity on a continuous basis without manual adjustments or intervention.

It is still another object of the present invention to provide a color monitor including a system of interchangeable detector-filter modules so that the wavelength regions being monitored can conform to the most important wavelength characteristic of the specimen.

Another object of the present invention is a color monitor that utilizes a closed loop feedback system to permit individual ratios of photodetector outputs to be monitored simultaneously.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like or corresponding parts in the several figures and wherein:

BRIEF DESCRIPTION OF THE DRAWINGS

FIG. 1 is a block diagram of a color monitor utilizing ambient light illumination constructed in accordance with the teachings of the present invention;

FIG. 2 is a perspective view, partly broken away, of one of the optical probes of FIG. 1;

FIG. 3 is a perspective view, partly broken away, of one of the photodetector modules of FIG. 1;

DESCRIPTION OF THE PREFERRED EMBODIMENTS

Figure 4:
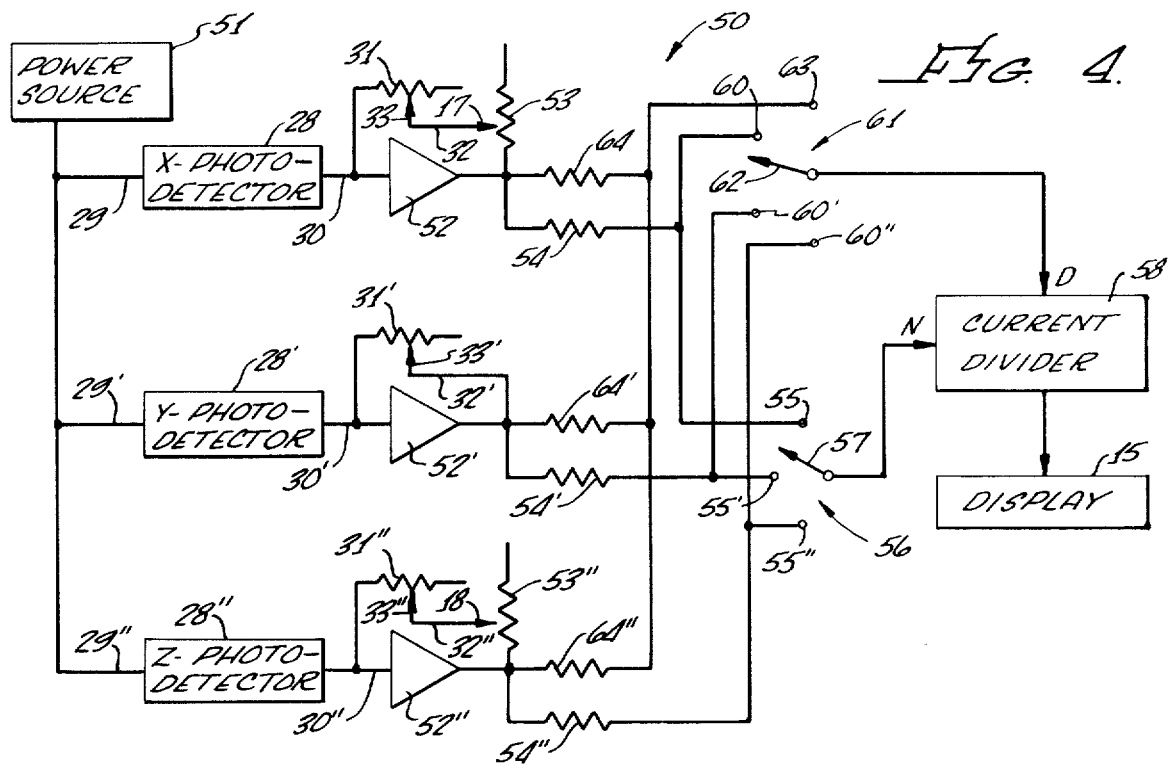
FIG. 4 is a circuit diagram of a first embodiment of ratioing instrument for use in the color monitor of FIG. 1.

Referring now to the drawings and, more particularly, to FIG. 1, there is shown a color monitor, generally designated 10, which is simultaneously responsive to light intensity at multiple wavelength regions emitted by or reflected from a specimen (not shown) illuminated by existing ambient light (not shown) for instantaneously determining relative ratios of the wavelength regions. Color monitor 10 includes a plurality of photodetector modules 11 and a plurality of identical optical probes 12, one for each photodetector module 11. Broadly, optical probes 12 consist of three identical telescopes for gathering light and imaging it on the sensitive portion of detector modules 11. Optical probes 12 have identical dimensions and imaging characteristics and are arranged in side-by-side, parallel relationship with their optical axes parallel in order to permit each probe 12 to be affected equally by ambient light changes.

The outputs of photodetectors 11 are conducted via an electrical cable 13 to an analyzing instrument, generally designated 14. Instrument 14 accepts the signals from detector modules 11 and displays them directly on a visual display 15 or as a mathematical computation as chosen by a selector switch 16. Instrument 14 also includes separate X and Z gain controls 17 and 18, respectively, as will be explained more fully hereinafter, which are used to calibrate instrument 14 against a standard specimen.

Referring now to FIGS. 2 and 3, each detector module 11 includes a housing having a planar front face 20 from which projects an elongate, hollow, thin-walled cylinder 21 and three electrical connectors 22, 23, and 24. Positioned at the external end of cylinder 21 is a disc 25 having a small orifice 26 therein which confines the incoming light rays to a definite area so as to better define the optical image. Positioned immediately behind disc 25 is a spectral filter 27 which is chosen to cover a specific narrow or broad band portion of the visible spectrum, depending upon the specimen characteristics. Positioned immediately behind filter 27 is a photodetector 28 which can be of any type that is sensitive to the wavelength region of interest. Photoresistive and photovoltaic detectors are especially suitable because of their small size and high sensitivity. This configuration whereby optical filter 27 is in close proximity to detector 28 is highly advantageous to minimize the effects of stray light leakage in optical probe 12.

Electrical connectors 22–24 are used to make contact with and hold detector module 11 in optical probe 12. As will be described more fully hereinafter, connector 22 is connected via an electrical lead 29 to detector 28 to provide power thereto, connector 23 is connected via an electrical lead 30 to detector 28 to carry the detector signal, lead 30 also being connected to one end of a variable resistor 31, and connector 24 is connected via an electrical lead 32 to the movable arm 33 of variable resistor 31. Variable resistor 31 permits the gain of each detector channel to be adjusted individually and may be adjusted in any of several known ways. This is highly advantageous to compensate for nonuniformity of detector response at different wavelengths and differences in energy transmittance between narrow bandpass and broad bandpass filters.

Each optical probe 12 consists of an elongate cylinder 35 which is open at one end 36 thereof for receipt of ambient light emitted by or reflected from a specimen. Positioned within cylinder 35, adjacent open end 36, is a convex lens 37 so that the light rays entering cylinder 35 can be concentrated at the focal point 38. At the other end of cylinder 35 is a disc-shaped, nonconductive termination 40 which is used to hold and make contact with connectors 22–24 of modules 11. More specifically, termination 40 has a central opening 41 and three additional openings 42–44 surrounding opening 41. The location and size of openings 41–44 correspond to the location and size of cylinder 21 and connectors 22–24, respectively. Positioned within each of openings 42–44 is an electrical contact which is connected via electrical leads 45–47, respectively, to electrical cable 13.

Thus, to connect one of detector modules 11 to one of optical probes 12, cylinder 21 is inserted into central opening 41 and upon continued movement, electrical connectors 22–24 enter openings 42–44, respectively. This procedure connects electrical connectors 22–24 to electrical leads 45–47, respectively, and aligns aperature 26 in disc 25 with the focal point 38 of lens 37. Thus, the light rays entering end 36 of cylinder 35 will be collimated and focused on detector 28. Other focal point positions will result in the collection of convergent or divergent light rays, but this will not effect the accuracy of the system. In fact, lens 37 may be entirely omitted if a wider angle of view is permissible.

For general operating conditions, it is essential that the basic dimensions of each probe 12 used in a multiple array be identical and that the individual probes 12 be attached to each other along parallel axes. If these two constraints are met, each probe 12 in an array will be affected equally by changes in the angle of illumination due to relative intensity changes in multiple lamp systems, due to movement of the lamps, or due to movement of the probes themselves. When each probe 12 in an array is affected equally, then it is obvious that the ratios of the detector signals remain constant regardless of changes in the illumination source. This characteristic permits monitor 10 to be used with existing ambient light, thereby eliminating the requirement for a carefully controlled and fixed detector light source system.

Referring now to FIG. 4, there is shown an electronic system, generally designated 50, for use in instrument 14, for ratioing the signals from detector modules 11. In FIG. 4, there is shown three photodetectors, 28, 28', and 28'', as described previously with regard to FIG. 3, including electrical leads 29, 29', and 29'', respectively, electrical leads 30, 30', and 30'', respectively, resistors 31, 31', and 31'', respectively, electrical leads 32, 32', and 32'', respectively, and movable arms 33, 33', and 33'', respectively. Electrical leads 29, 29', and 29'' are connected to a suitable power source 51 for providing an operating voltage for detectors 28, 28', and 28'', respectively. Detectors 28, 28', and 28'', or more if desired, can be of any type that provides a linear or semi-linear current proportional to light intensity. Each of detectors 28, 28', and 28'' would be mounted in a detector-filter module 11 connected to an optical probe 12 as described previously. Furthermore, detectors 28, 28', and 28'' can be conveniently labeled X, Y, and Z, although their spectral responses need not necessarily correspond to the CIE Standard Observer spectral response characteristics.

The output currents from detectors 28, 28', and 28'' on lines 30, 30', and 30'', respectively, are applied to operational amplifiers 52, 52', and 52'', respectively, which convert the currents to corresponding voltages. Resistors 31, 31', and 31'' are connected as feedback resistors for amplifiers 52, 52', and 52'', respectively, so as to control the gains thereof. In addition, the gain of the X and Z channels can be further modified by variable resistors 53 and 53'', respectively, connected in series with resistors 31 and 31'', respectively, the movable wipers 17 and 18 of variable resistors 53 and 53'', respectively, being shown in FIG. 1.

The individual voltages from amplifiers 52, 52', and 52'' are then converted to currents by series resistors 54, 54', and 54'', respectively, first ends of which are connected to the outputs of amplifiers 52, 52', and 52'', respectively, and the other ends of which are connected to the stationary terminals 55, 55', and 55'', respectively, of a switch 56 having a movable arm 57. Thus, one of the current outputs of the X, Y, or Z channels may be selected by switch 56 for transmission to the numerator input N of a current divider 58.

Resistors 54, 54', and 54'' are also connected to the stationary terminals 60, 60', and 60'', respectively, of a second switch 61 having a movable arm 62 and a fourth stationary terminal 63. Arm 62 of switch 61 is connected to the denominator input D of current divider 58. This permits the signal from any channel to be divided by the signal from any other channel. In addition, the outputs of all three channels from aplifiers 52, 52', and 52'' are connected to first ends of additional resistors 64, 64', and 64'', respectively, the other ends of which are all connected to terminal 63 of switch 61. In this manner, the outputs of the three channels can be summed and this sum connected to the denominator input D of current divider 58 so that the signal from any channel can be divided by the total of the signals from all channels. The output of divider 58 is then transmitted to display 15 or other read-out mechanism. The output of current divider 58 can be subsequently digitized for a digital printer or for a computer.

Resistors 31, 31', and 31'' are most conveniently used as fixed calibration resistors for the individual detector modules 11 and are preferably made as an integral part of the detector module, as shown in FIG. 3. On the other hand, resistors 53 and 53'' are most conveniently used as front panel controls for everyday calibration purposes, as shown in FIG. 1.

It is most convenient to match the resistor values to the sensitivity of display 15 so that the sum of the X, Y, and Z signals equals a reading 1.00. On the other hand, the total of the ratios of each channel output to the sum of all of the channel outputs is always constant, regardless of the settings of the variable resistors. However, it should be understood that although the sum of the $\bar{x}$, $\bar{y}$, and $\bar{z}$ ratios is fixed and constant, where $$\bar{x} = \frac{X}{X+Y+Z}, \bar{Y} = \frac{Y}{X+Y+Z}, \text{ and } \bar{z} = \frac{Z}{X+Y+Z}.$$

the individual ratios are affected not only by the chromaticity of the specimen itself, but also by the settings of the variable resistors 31, 31', 31'', 53, and 53'', the color temperature of the light source, the characteristics of photodetectors 28, 28', and 28'', and the characteristics of spectral filters 27. Consequently, a fixed chromatic specimen must be used as a reference standard. One suitable reference standard would be a white magnesium oxide plate. A suitable calibration procedure would be to point probes 12 with their associated detectors 11 at this reference standard and adjust controls 17 and 18 until a reading of 0.333 is obtained for the $\bar{x}$ and $\bar{z}$ ratios. Under these circumstances, arm 62 of switch 61 is positioned in contact with terminal 63 and arm 57 of switch 56 is alternated between terminals 55 and 55''. The $\bar{y}$ ratio would then be 0.334, by definition. Subsequent readings taken on other specimens would then be related to the magnesium oxide reference standard. Thus, $\bar{x}$, $\bar{y}$, and $\bar{z}$ ratios of 0.167, 0.333, and 0.500 would indicate that the unknown specimen emitted 50% less of the X wavelengths, equal Y wavelengths, and 50% more of the Z wavelengths than that of the reference standard. Different reference standards and different setting points could, of course, be used as needed for specific applications.

Figure 5:
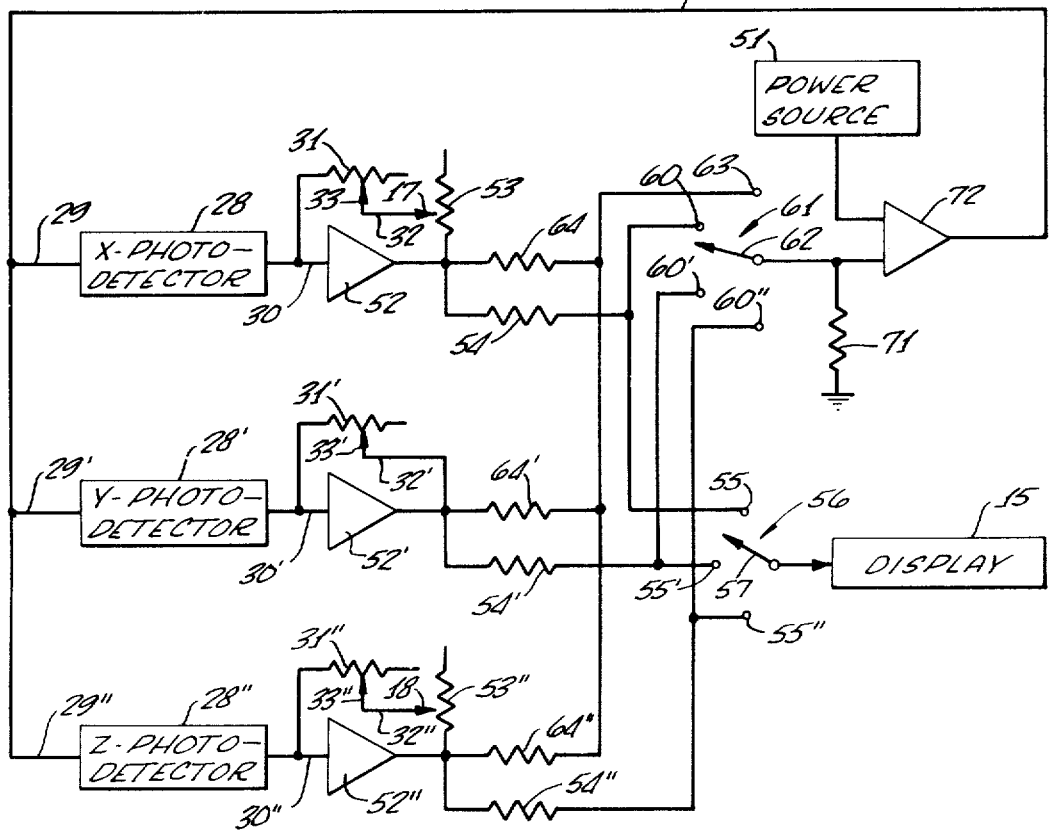
FIG. 5 is a circuit diagram of a second embodiment of ratioing instrument for use in the color monitor of FIG. 1.

Referring now to FIG. 5, there is shown an electronic system, generally designated 70, for use in instrument 14, for ratioing the signals from detector modules 11. System 70 includes photodetectors 28, 28', and 28'', amplifiers 52, 52', and 52'', resistors 31, 31', and 31'', 53, 53'', 64, 64', 64'', 54, 54', and 54'', and switches 56 and 61 interconnected and functioning exactly as described previously with regard to electronic system 50. In circuit 70, however, current divider 58 is omitted. Instead, a voltage divider resistor 71 and an amplifier 72 are connected between movable arm 62 of switch 60 and the inputs of photodetectors 28, 28', and 28'' via a lead 73 to form a closed loop system. Power source 51 also provides a second input to amplifier 72.

In operation, amplifier 72 attempts to maintain the current output selected by switch 62 constant and proportional to the reference voltage impressed on it from power source 51. In other words, if the current from photodetectors 28, 28', and 28'' decreases, as would be the case if the total light intensity decreased, the input voltage to amplifier 72 from switch 60 would also decrease, so that the differential input to amplifier 72 increases, the differential input to amplifier 72 being the difference between the fixed voltage from power source 51 and the variable voltage across resistor 71. Thus, as this differential voltage increases, the voltage applied to photodetectors 28, 28', and 28'' via electrical lead 73 increases. If photodetectors 28, 28', and 28'' are sensitive to voltage changes, as are photoresistors, their output currents will now increase, again creating a balance at the input of amplifier 72. In other words, such a closed loop system tends to keep the total output voltages of amplifiers 52, 52', and 52'' constant, regardless of illumination intensity. Therefore, the denominator of the ratio is automatically fed into the circuit by means of switch 60 and the closed loop and any one or all of the outputs of amplifiers 52, 52', and 52'' can be monitored simultaneously to provide simultaneous ratio information for all channels. Thus, the output of switch 56 may be connected to display 15 or a multiplicity of displays may be provided connected to any one or more of contacts 55, 55', and 55''. In addition to the preceding advantage, this closed loop feedback circuit is more stable than system 50 because of the inherent simplicity of amplifier 72 as compared to a current ratioing module like divider 58. The primary disadvantage of system 70 is that it cannot be used with voltage insensitive detectors such as photovoltaic detectors. In any event, both systems 50 and 70 fulfill the requirements of a simple, reliable system for continuously obtaining the relative portion of light detected by multiple photodetectors having different spectral response characteristics.

It can therefore be seen that according to the present invention, there is provided a color monitor 19 for making instantaneous color measurements that overcomes the primary disadvantages of the color monitors currently in general use. Color monitor 10 makes instantaneous and simultaneous color measurements of light intensity at multiple wavelength regions, thereby eliminating the errors caused by sample and light instabilities. With monitor 10, closed chambers and carefully controlled light sources are completely eliminated. The specimen need not be of any particular size and need not be capable of being held flat. Thus, monitor 10 is useful in a wide variety of applications.

Monitor 10 includes a unique system of interchangeable detector-filter modules 11 and optical probes 12 that can be used for measuring the tristimulus values of surfaces illuminated by existing ambient light. If desired, modules 11 can have the broad band CIE Standard Observer spectral response characteristics to conform to the outputs of other color monitors. On the other hand, detectors 11 can be quickly unplugged and replaced by narrow bandpass detector-filter modules in order to increase sensitivity to small changes, to reduce errors due to metamerism, and to better fit the spectral characteristics of the particular specimen being measured. With judicious selection of these narrow bandpass detectors, accuracies approaching those of scanning spectrophotometer systems can be realized.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. A color analyzer simultaneously responsive to light intensity at multiple wavelength regions emitted by or reflected from a specimen illuminated by existing ambient light for instantaneously determining relative ratios of said wavelength regions comprising:
    a plurality of photodetectors having different spectral response characteristics;
    a separate optical probe for each photodetector for imaging the light emitted by or reflected from said specimen onto its associated photodetector, said optical probes having identical dimensions and imaging characteristics and being arranged in side-by-side, parallel relationship in order to permit each optical probe to be affected equally by ambient light changes; and
    means responsive to the outputs of said photodetectors for ratioing said outputs and providing the resultant ratio signals for utilization.

2. A color analyzer according to claim 1 wherein each photodetector is removably connected to its associated optical probe to permit ready interchangeability of photodetectors.

3. A color analyzer according to claim 1 wherein each optical probe includes, at one end thereof, a termination including a plurality of electrical contacts connectible via an electrical lead to said ratioing means and wherein each photodetector is mounted in a module including a plurality of electrical contacts connected to the associated photodetector, the photodetector module being connectible to said optical probe with said module electrical contacts contacting said probe electrical contacts to conduct power to and receive signal from said photodetector without separate electrical connection to said photodetector module.

4. A color analyzer according to claim 3 wherein each of said photodetector modules also includes a variable gain control resistor to individually control the gain of each photodetector.

5. A color analyzer according to claim 4 wherein each photodetector module includes a spectral filter positioned immediately adjacent the associated photodetector to control the portion of the visible spectrum received by said photodetectors.

6. A color analyzer according to claim 1 wherein said ratioing means comprises:
    first switch means connectible to the output of any individual one of said photodetectors or combination of photodetectors;
    second switch means connectible to the output of any one of said photodetectors; and
    divider means connected to said first and second switch means for dividing the output of said second switch means by the output of said first switch means for obtaining the ratio of light intensity sensed by any individual one of said photodetectors against the light intensity sensed by any other photodetector or combination of photodetectors.

7. A color analyzer according to claim 1 wherein said ratioing means comprises:
    separate amplification channels for the outputs of said photodetectors; and
    a closed loop feedback system connected between the outputs of said channels and the inputs of said photodetectors for maintaining the total of the current outputs of said channels constant with changes in specimen illumination whereby the individual ratios of any or all of said photodetectors may be monitored simultaneously to provide simultaneous ratio information for all of said channels.

* * * * *